Patented July 21, 1953

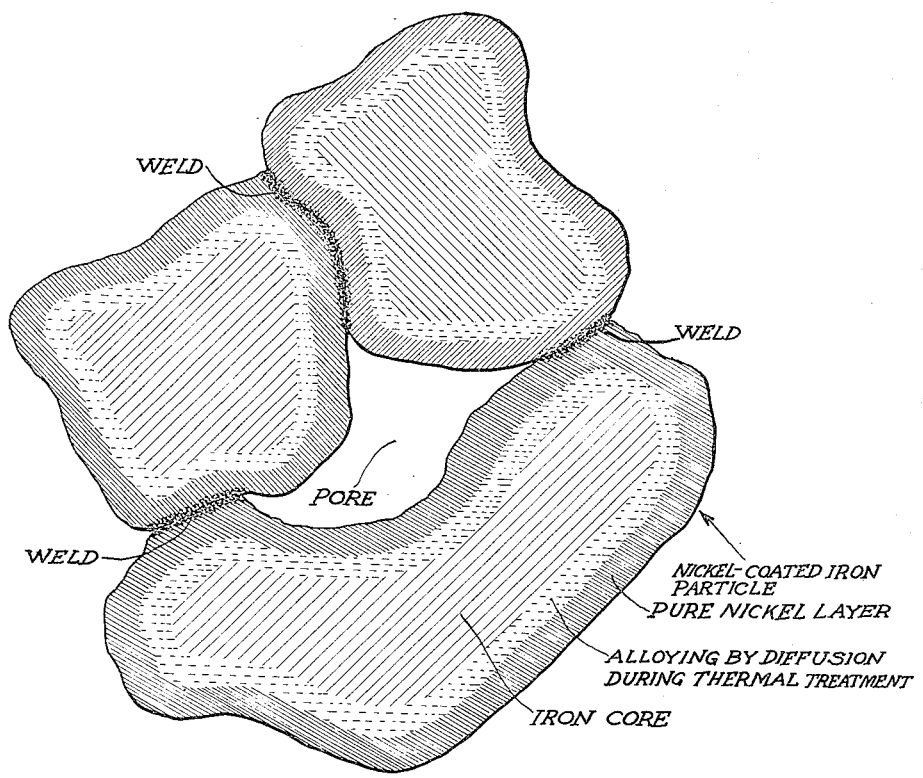

2,646,456

UNITED STATES PATENT OFFICE 2,646,456

FABRICATION OF STORAGE BATTERY PLATES

Pierre A. C. Jacquier, Paris, France, assignor to Societe des Accumulateurs Fixes & de Traction, Romainville, France, a French body corporate Application July 10, 1951, Serial No. 236,069

9 Claims. (Cl. 136—28)

This invention relates to a process for fabricating porous plates of nickel and iron for alkaline storage batteries and to the product thereof. Plates produced in accordance with this invention are produced by making powder composed of fine porous particles of nickel or of nickel-coated iron and subsequently sintering or fusing the particles forming the powder, i. e., by subjecting a quantity of the powder to a heat treatment, varying in accordance with the desired character of the plates, which fuses the particles to form a consolidated or integral porous mass. The battery plates can then be impregnated with active materials in known manner.

In accordance with and for the purposes of this invention, very fine powders composed of porous particles of nickel or of porous particles consisting of nickel-coated iron are produced by a two-step process involving, first the production of fine iron powder composed of porous iron particles, and thereafter the treatment of such iron powder in such manner as to exchange nickel for the iron, presumably by reason of the difference of position of iron and nickel in the electromotive scale. By controlling the intensity or duration of the exchange treatment, the thickness of the nickel coating on the iron particles is made to exceed 20% of the total amount of nickel and iron.

The structure or character of the plates produced by sintering from such powders composed of nickel particles or nickel-coated particles is highly satisfactory. The structure is highly cohesive; the proportion of nickel to iron in the plates may be controlled and varied throughout wide ranges, and there is a uniform distribution and intermixture of the nickel and iron throughout the plates. Porosities as high as 80% can be obtained because the chemical exchange of nickel for iron does not impair the basic porous structure of the iron particles and because there is inappreciable shrinkage during the sintering or fusing. This porosity gives the plates a very large effective surface area. Results of this character can be obtained only with the substantially pure iron (over 99% pure) such as that resulting from the reduction of iron oxides. The mixture of iron and nickel is obtained without mechanical mixing and the distribution of iron and nickel is very uniform, it having been found that mechanical mixing of separate iron and nickel powders changes the structure of the powders, increases their apparent density, decreases their porosity and the porosity of plates produced therefrom, and does not give uniform distribution of iron and nickel. The porous iron powder is cheaply prepared and the resulting nickel-coated particles possess the porosity of the original iron powder; and they possess the desirable properties of nickel powder, such as resistance to disintegration in the operation of the battery.

In forming battery plates by fusing or sintering, the powder is molded in the desired shape in a mold or placed upon a sheet metal core; and upon such supports the powders may be sintered to produce highly porous material to be impregnated with the active compounds of the batteries. In such operation, the layer of porous material adheres particularly well to the metal base or support; and negative plates will be made from powder having a higher iron content while positive plates will be made from powder having a higher nickel content.

In the production of battery plates in accordance with this invention, there is the advantage that in the sintering to produce a porous mass there is adherence of a nickel surface to an iron surface producing a mass in which no iron is exposed such as might occur if the replacement of iron by nickel were effected after the sintering of the iron particles. Such adherence of nickel to iron gives a much stronger and durable porous mass. Moreover, the coating of each particle of iron insures a very uniform distribution of nickel in the sintered mass produced from the powders of this invention, each particle of which carries its proper proportion of nickel.

In essence, the process of this invention comprises producing porous iron particles of high purity and porosity, introducing a powder of such iron particles into a solution of a nickel salt and permitting a chemical exchange to take place between the iron of the particles and the nickel ions of the solution, i. e., some or all of the iron of the introduced particles dissolves in the solution in ionic form and takes the place of the nickel ions, the nickel ions, in a converse manner, coming out of solution as metallic nickel and depositing on the particles in the place of the dissolved iron.

The full nature of the invention together with all of its objects and advantages will be better understood from the accompanying drawing and the following description of one illustrative process for implementing it.

The accompanying drawing is a diagrammatic illustration on a greatly enlarged scale of a fragmentary portion of a porous metallic electrode plate made in accordance with the methods of this invention illustrating diagrammatically the structure and inter-relationship of the particles forming said porous plate.

Various methods may be used for initially producing the porous iron particles in powdered form suitable for use in the process of the invention. Thus, iron oxides may be reduced in a hydrogen atmosphere, for example, by performing the reduction in hydrogen at low temperatures (e. g. between 400° C. and 650° C., preferably about 490° C.), cooling to about 100° C. while the iron is still in the hydrogen, substituting carbon dioxide gas for the hydrogen at this temperature, and then cooling the reduced iron powder in the carbon dioxide to room temperature. This will produce a nascent or active iron powder of high porosity and very high purity, for example, one containing metallic iron of 99% purity. Alternatively, the reduction may be carried out at temperatures about 650° C., preferably about 700° C., and cooling the reduced iron powder to room temperature while still in the reducing atmosphere. Both of these methods will make possible the production of non-pyrophoric iron powders of suitable particle porosity and size. The porosity apparently may be explained by the fact that density of iron is greater than the density of iron oxide, for which reason iron would take up less space than iron oxide.

Iron oxides may be produced in any suitable manner. For example, iron carbonate may be produced by mixing iron sulfate with sodium carbonate or with ammonium carbonate; and thereafter the iron carbonate may be heated to produce iron oxide. Similarly iron oxide may be obtained by heating iron oxalate which may be produced by mixing iron sulfate with ammonium oxalate.

The iron powder may also be obtained by the thermal decomposition of iron carbonyl, or any method producing fine porous particles.

As a next step, there may be prepared a solution of nickel salt of any suitable composition, but I have had superior results using a bath of the following general composition:

150 to 400 grams per liter of nickel sulphate ($NiSO_4.7H_2O$)
20 to 30 grams per liter of nickel chloride ($NiCl_2.6H_2O$)
About 25 grams per liter of boric acid The boric acid content is optional. The pH of this solution or bath may vary between 3 and 7, but preferably should be about 6. Its temperature may vary between about 50° C. and 100° C., but preferably should be about boiling temperature. Preferably, the amount of nickel in solution should be about 25% greater than that needed for the final product, i. e., 25% greater than that needed to give the desired ratio of iron to nickel in the particles finally formed by the further processing which is presently to be explained. Preferably, the nickel chloride should remain at about the concentration indicated above, but any or all of the nickel sulphate may be replaced in molecular proportion by nickel chloride. The powdered iron particles should be introduced into this solution or bath while the solution or bath is constantly stirred or otherwise agitated in order that the chemical exchange between the nickel and iron elements may take place to best advantage and with maximum uniformity. After a predetermined lapse of time, the particles should be suitably separated from the solution or bath and prepared for sintering. At this stage, the iron of the particles will be found to have been partially or wholly replaced by nickel to a degree depending upon the duration of the elapsed time during which the particles were in the solution or bath. The nickel content should exceed 20% of the total content of nickel and iron.

As a particular example of the process, ten kilograms of the iron powder may be placed into 200 liters of a solution containing 290 grams per liter of $NiSO_4.7H_2O$ and 30 grams per liter of $NiCl_2.6H_2O$ with a pH of 6. If this is stirred while boiling for about six hours, a powder of particles having about 88% of nickel will be produced. As another example, five kilograms of iron powder may be placed in 100 liters of a solution containing 175 grams per liter of $NiSO_4.7H_2O$ and 30 grams per liter of $NiCl_2.6H_2O$ with a pH of 6. If this is stirred while boiling for 2 hours, a powder of particles having about 62% of nickel will be obtained. The remaining percentage in both examples is, of course, the original iron of the introduced iron particle.

The particles of the final product may be made to have a variable content or variable ratio of the two constituents depending on various factors in the processing, such as the concentration of the nickel salt, the temperature, and the time during which the exchange is permitted to take place. Thus, it is possible to obtain particles of widely varying composition, for example, from those containing slightly more than the 20% minimum of nickel to those containing very little iron; it is even possible to obtain particles of pure nickel provided that the iron particles initially introduced are very porous and very fine so that the solution has ready access to all of the iron and the bath is renewed as required. This characteristic of the process and its product is particularly advantageous for the fabrication of plates for alkaline storage batteries since negative sintered plates having a relatively high iron content and positive plates having a relatively high nickel content may be desirable.

The physical structure of the final product will in character be quite similar to that of the powdered iron initially introduced. For example, if fine iron particles are introduced, fine particles will appear in the final product; if very porous iron particles are introduced, very porous particles will appear in the final product.

In forming the powder into storage battery plates, that portion of the powder which eventually forms the carrier of the active material is subjected to a minimum of, or no, pressure, as by placing the powder, preferably with a strengthening core or frame such as a screen or perforated plate embedded therein, in a flat mold having a depth substantially equal to the thickness of the desired plate and then levelling off the top of the layer of powder by a simple scraping operation that does not compress the powder. The battery plate is then formed by sintering of the powder in the mold at high temperature (e. g. from 700° C. to 1000° C., and preferably 800° C.) and in a hydrogen atmosphere. It has been noted that the porous sintered material adheres particularly well to the core or framework, especially if the latter be of iron.

Plates fabricated in accordance with the foregoing possess very high porosity, a very low internal resistance, great strength and a large effective or active surface area. Prior to actual use, the plates are suitably impregnated with active materials, for example a positive plate may be impregnated with nickel hydrate (with an optional admixture of cobalt hydrate), and a negative plate may be impregnated with cadmium hydrate or iron hydrate or both.

Particularly in the case of the preparation of sintered storage battery plates, the method described is superior to that method wherein the nickel is added to a sintered iron plate by exchange after the iron plate has been sintered.

In the latter method, the subsequent exchange solution tends to impair the physical strength of the previously sintered iron plate. Moreover, the speed of the exchange would be impractically slow with the latter method; whereas when the method of the invention is used the time required for the completion of the desired amount of exchange between the nickel and the iron is within the range of practicability. Lastly, if the nickel is added to a previously sintered iron plate, it would be necessary to perform a second sintering operation to overcome the effect of the exchange of nickel for iron, whereas with this method of the invention a single sintering operation will suffice.

Iron-nickel powder useful in the practice of this invention may be prepared by using nickel recovered from waste or scrapped positive plates of alkaline batteries. As an example of such procedure, the old positive plates are decorticated or comminuted in a known manner, for example in a ball crusher, and then the iron is eliminated in a known manner, for example by means of magnetic separator. This substance thus recuperated contains about 50% of nickel expressed in metal and about 2.5% of iron expressed in metal. These figures obviously may vary depending upon the composition of the scrap. Then 30 kilos of this material is treated with 200 liters of sulphuric acid 66° Bé. which are previously diluted to obtain 1200 liters of diluted acid with 290 grams per liter of $H_2SO_4$. The acid is poured cautiously onto the mass because the latter contains carbonates. After the effervescence ceases, the mixture is heated at boiling temperature for about five hours, maintaining the volume constant by adding water. Finally, the mixture is concentrated slightly and the excess of acid is neutralized in the cold by means of caustic soda in order to bring back the acidity of the solution to about 3 pH. By filtration there is obtained a solution containing 80 grams per liter of nickel expressed in metal and 3.5 grams per liter of iron expressed in metal. The yield in nickel of this operation is about 90%. This solution is now ready for use in the exchange or permutation process. It is further diluted in order to have a solution of 50 grams per ilter of Ni expressed in metal. To this solution there is added 16 to 25 grams per liter of $NiCl_2.6H_2O$. To the final solution, iron powder is introduced in the proportion of 50 grams of iron powder per liter of the solution. With agitation at boiling temperature for about three hours, there is obtained finally iron-nickel powder containing 72% of nickel. Similarly, iron-nickel powder may be prepared with nickel-containing solutions prepared from nickel-containing scrap obtained from other sources.

The specific details contained in the foregoing description of examples of my invention are mentioned for the purpose of facilitating an understanding of my invention and not as limiting it. My invention includes such variations of such details as fall within the following claims.

What is claimed is:

1. The method of making highly porous metallic plates for use as electrodes for alkaline storage batteries comprising reducing iron oxides to produce non-pyrophoric, finely-divided porous iron powder, immersing determined quantities of said powder for a determined time in a solution of nickel salts for chemical exchange between the iron of the iron powder and the nickel of the solution so that the metallic nickel of the solution replaces iron forming nickel-coated iron particles, separating the nickel-coated iron particles from the solution, molding the latter particles with a minimum of compacting into the configuration of a storage battery plate and thereafter sintering the molded particles to form a porous storage battery plate.

2. The method of claim 1 in which the sintering of the molded nickel-iron powder is effected in a reducing atmosphere at a temperature between 700° and 1000° C.

3. The method of claim 1 in which the reduction of the iron oxide is effected at a temperature of approximately 490° C.

4. The method of claim 1 in which the solution of nickel salts contains from 150–400 grams per liter of nickel sulphate ($NiSO_4.7H_2O$) and from 20 to 30 grams per liter of nickel chloride ($NiCl_2.6H_2O$).

5. The method of claim 1 in which the replacement of iron by nickel is limited by the immersion of the iron particles in the solution of nickel salts for a predetermined time.

6. The method of claim 1 in which the replacement of iron by nickel by immersion is between 20% and 100% of the weight of the iron particles immersed in said solution of nickel salts.

7. A storage battery plate comprising a body of sintered nickel-coated porous iron particles made in acord with the method of claim 1.

8. A storage battery plate according to claim 7 in which the particles are uncompacted.

9. The method of making highly porous metallic plates for use as electrodes for alkaline storage batteries which comprises reducing iron oxides in a hydrogen atmosphere at temperatures between 400° and 700° C. to produce non-pyrophoric, finely-divided, porous iron powder, immersing the said powder in determined quantities for a determined time in a solution of nickel salts for chemical exchange between the iron of the iron powder particles and the nickel of the solution so that the metallic nickel of the solution replaces iron forming nickel-coated iron particles and the nickel replacement is in excess of 20% of the total nickel and iron content of the product resulting from the treatment, separating the nickel-coated iron particles from the solution, molding the latter particles with a minimum of compacting into the configuration of a storage battery plate and thereafter sintering the molded particles to form a porous storage battery plate.

PIERRE A. C. JACQUIER.

References Cited in the file of this patent

UNITED STATES PATENTS

| Number | Name | Date |
|---|---|---|
| 645,978 | Silvey | Mar. 27, 1900 |
| 884,930 | Jungner | Apr. 14, 1908 |
| 1,506,246 | McMahon | Aug. 26, 1924 |
| 1,986,197 | Harshaw | Jan. 1, 1935 |
| 2,191,813 | Brown | Feb. 27, 1940 |
| 2,198,042 | Schlecht | Apr. 23, 1940 |
| 2,289,897 | Balke | July 14, 1942 |
| 2,544,112 | Schneider | Mar. 6, 1951 |

FOREIGN PATENTS

| Number | Country | Date |
|---|---|---|
| 653,235 | Great Britain | May 9, 1951 |

OTHER REFERENCES

Protective Coatings for Metals, by Burns and Schub, 1939, page 161.

Handbook of Non-Ferrous Metallurgy—Recovery of Metals, Liddel, McGraw-Hill Book Co., 1945, page 602.